June 28, 1949.
A. SIMMON ET AL
2,474,378
POWER DRIVEN FLASH SYNCHRONIZER
FOR PHOTOGRAPHIC SHUTTERS
Filed April 21, 1945
3 Sheets-Sheet 1
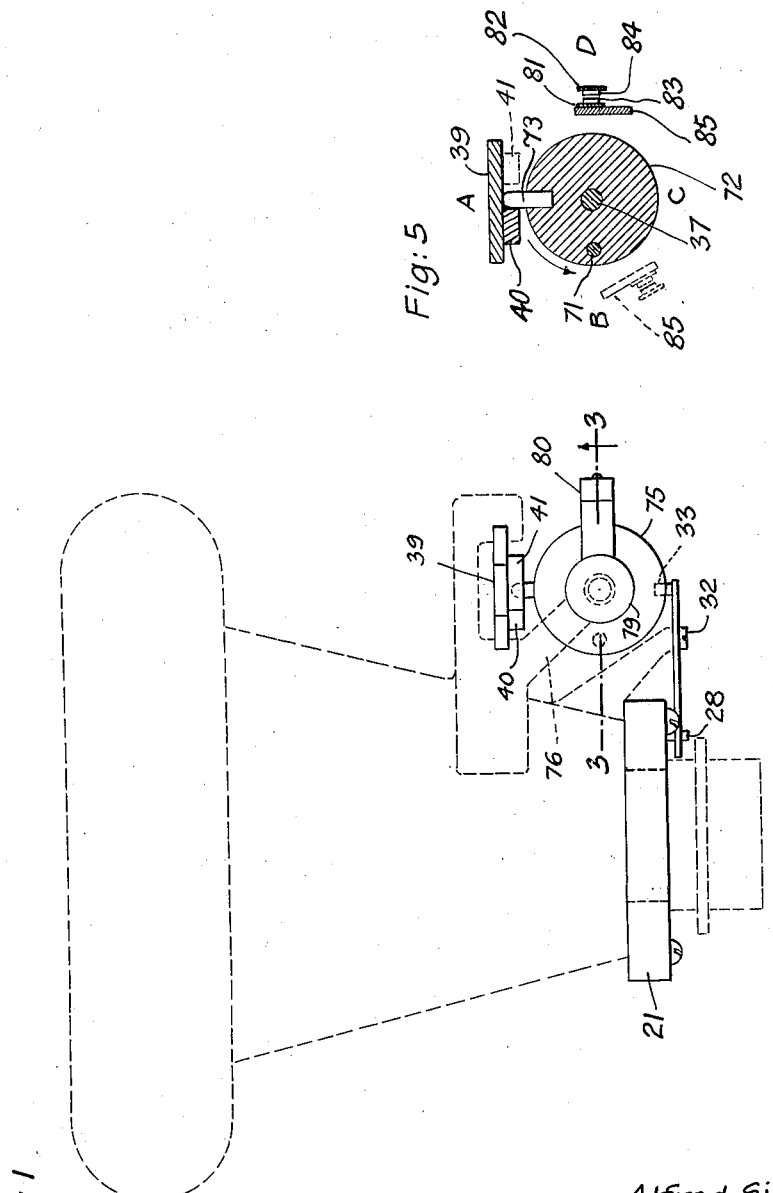
Alfred Simmon
Louis L. Weisglass
INVENTORS
BY Walter E. Wollheim
ATTORNEY.

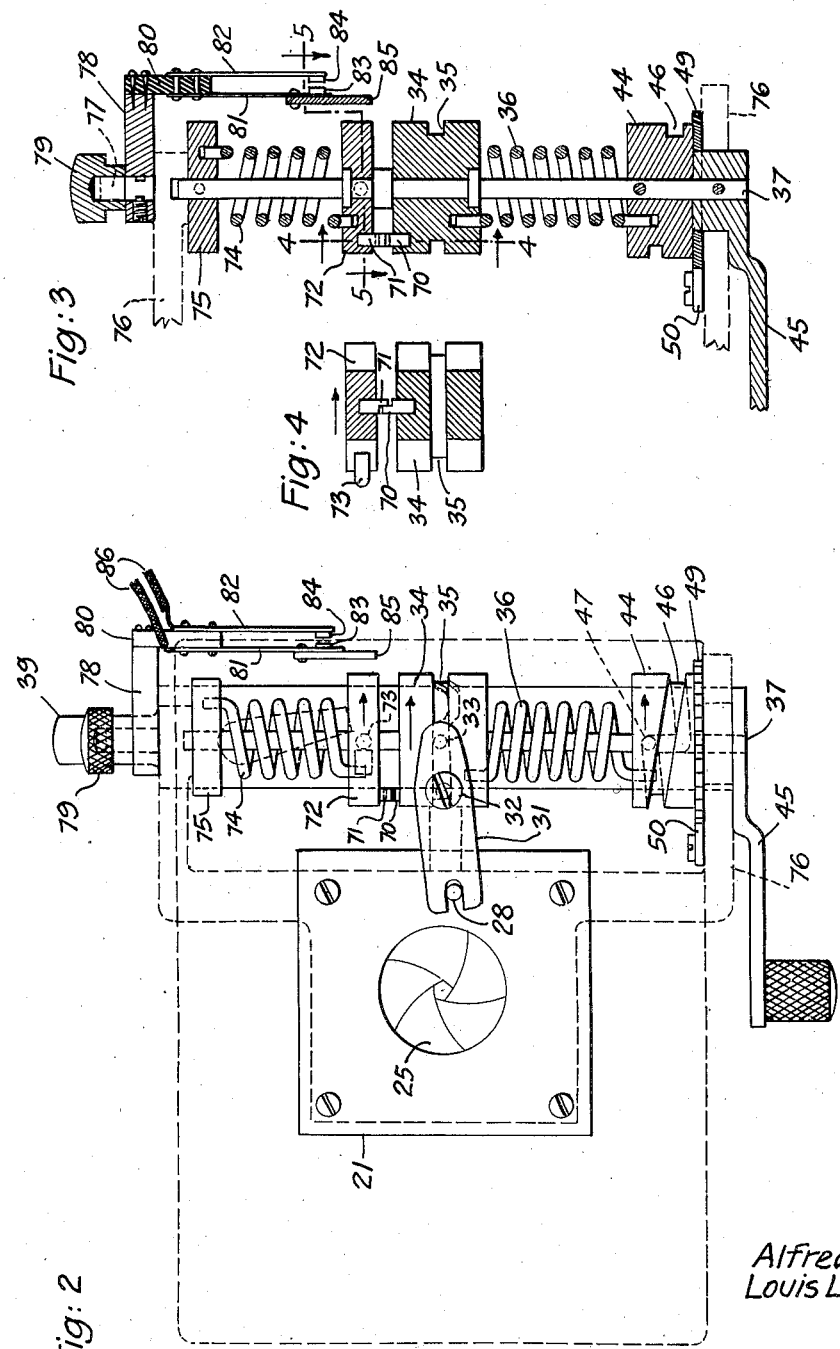

June 28, 1949.　　A. SIMMON ET AL　　2,474,378
POWER DRIVEN FLASH SYNCHRONIZER
FOR PHOTOGRAPHIC SHUTTERS
Filed April 21, 1945　　3 Sheets-Sheet 3
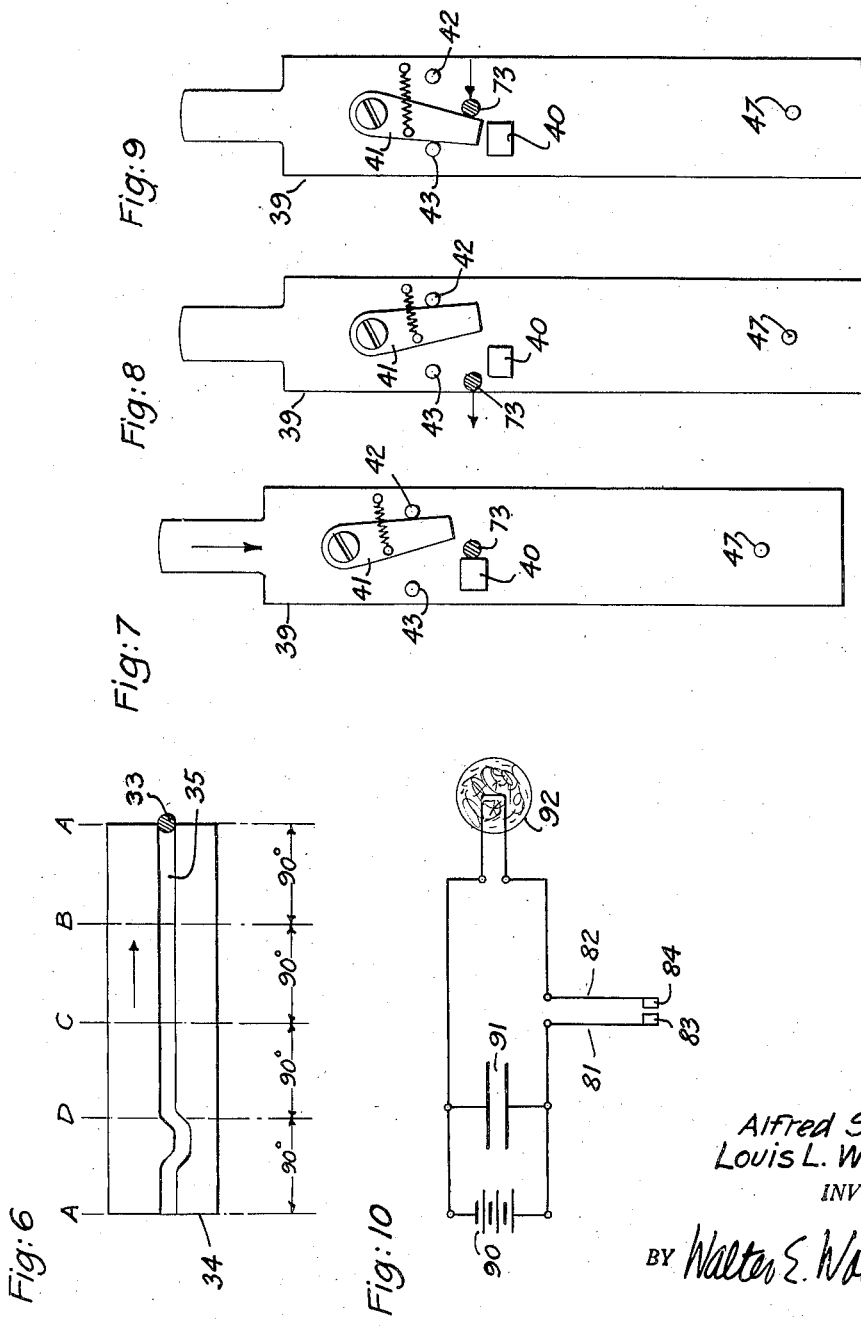
Alfred Simmon
Louis L. Weisglass
INVENTORS
BY Walter E. Wollheim
ATTORNEY.

Patented June 28, 1949

2,474,378

UNITED STATES PATENT OFFICE 2,474,378

POWER-DRIVEN FLASH SYNCHRONIZER FOR PHOTOGRAPHIC SHUTTERS

Alfred Simmon, Jackson Heights, and Louis L. Weisglass, New York, N. Y., assignors, by direct and mesne assignments, to Simmon Brothers, Inc., Long Island City, N. Y., a corporation of New York Application April 21, 1945, Serial No. 589,484

5 Claims. (Cl. 95—11.5)

This invention refers to synchronizers, the kind which establish an electrical contact in the circuit of a photo flash lamp in timed relationship with the action of a camera shutter in such a way that the photo flash lamp is at the peak of its light emission when the shutter is wide open.

While proposed designs for synchronizers of this character have been exceedingly numerous, the type most successful in practice comprised a spring driven "master element" which established the contact and released the shutter at the proper time interval.

The most serious disadvantage of this system is that the very act of contact making or shutter releasing is liable to change the speed of the master element itself. The acts of contact making and shutter releasing follow the laws of impact of semi-elastic bodies, complicated by friction, and it can be easily understood that the loss of speed suffered by the master element thereby is unpredictable as well as inconsistent. A very undesirable element of uncertainty is thereby introduced which is liable to jeopardize the perfect synchronization of lamp and shutter.

The situation is further complicated by the fact that in the past all synchronizers were designed for flash lamps having a relatively long time lag, i. e., the peak of light emission occurred 20 milliseconds after contact was made, and for shutters having a relatively short time lag in which the shutter was wide open 5 milliseconds after release. This situation is likely to change in the future because new flash lamps have been developed which have a very much shorter time delay, and since it appears desirable to lengthen the time lag or acceleration time of the shutter since this would facilitate the very desirable development of shutters with higher speeds than presently available.

It is the object of this invention to provide a synchronizer which is not only free from the uncertainty described above, but which is also applicable to high speed shutters with a relatively long acceleration time and which is also applicable to flash lamps having a very short as well as those having a conventional time lag.

This is accomplished by providing two separate and independent spring driven motor elements, one being part of a photographic shutter of any suitable design and the other adapted to actuate the electrical contact, and by providing means to release both motor elements simultaneously. In this manner, there will be absolutely no exchange of mechanical energy between the two systems and, therefore, anything that may happen in one system cannot, in any way, affect the timing of the other system.

A preferred embodiment of the invention is described in the following specification and illustrated in the accompanying drawings in which Fig. 1 shows a plan view of a camera equipped with a shutter and synchronizer according to the principles of our invention;

Fig. 2 shows the front view of the same camera, but without the lens; the camera itself is shown in dotted lines more or less schematically since it does not form part of this invention, and parts of minor importance such as a housing surrounding the shutter parts and others have been omitted in the interest of clarity;

Fig. 3 is a longitudinal sectional view along the plane of line 3—3 in Fig. 1;

Fig. 4 is a longitudinal sectional view along the plane of line 4—4 in Fig. 3;

Fig. 5 is a cross-sectional view along the plane of line 5—5 in Fig. 3;

Fig. 6 is a development of the shutter actuating cam;

Fig. 7, 8 and 9 show the release mechanism of the shutter and synchronizer in three different stages of its movement; and Fig. 10 shows the electrical circuit diagram.

We wish to emphasize that the photographic shutter shown in these specifications has been merely selected as a typical example and that the synchronizer itself is in no way limited to a combination with this particular shutter, but that it is equally applicable to a shutter of almost any other conceivable description. The shutter selected as a typical example is identical with one disclosed in detail in Patent #2,371,072, granted to us on March 6, 1945, and it will be described in the following specification only as far as necessary for the full understanding of the invention.

The shutter consists of 4 principal parts, the blade assembly, the connecting lever, the motor unit and the rewinding device. The blade assembly comprises a housing 21 containing 5 pivoted shutter blades 25 of conventional design. These shutter blades are connected by a blade actuating ring, not shown, which terminates in a pin 28. A slot of suitable dimensions is provided in the housing for this pin. This blade assembly is shown to be mounted behind the camera lens but can, of course, be also mounted between the elements of said lens, if so desired.

A lever 31 is mounted on the camera in such a way that it can swivel around pivot 32. One end of the lever has a slot for the aforementioned pin 28 of the blade assembly, and the other end of the lever carries a pin 33 which cooperates with the motor unit.

The motor unit comprises a flywheel 34 of substantially cylindrical shape and equipped with a cam groove 35 which engages pin 33 of the connecting lever 31. A developed view of this flywheel with its cam groove is shown in Fig. 6. This flywheel is mounted rotatably on shaft 37 which forms part of the rewinding device. Fastened to the flywheel is a pin 70 which cooperates with a similar pin 71 which is part of the synchronizer and which will be described later. As can be seen in Fig. 4, pin 71 restrains pin 70 and thereby the entire motor unit, or in other words, the motor unit cannot move until pin 71 starts to move first. Pin 71 and 70, therefore, constitute a mechanical interlock between the two motor units making it possible to release both of them at precisely the same moment. A spring 36 is provided, one end of which is fastened to the flywheel 34 and the other end of which is fastened to a cylindrical body 44 which is part of the rewinding device.

This rewinding device consists of a shaft 37 to which crank 45 as well as the cylindrical body 44 are fastened. Cylindrical body 44 is equipped with a cam groove 46 of peculiar shape which cooperates with a pin 47 of the release lever to be described later. The purpose of this arrangement is to provide a sequence control so that the shutter cannot be rewound unless an exposure has taken place, and an exposure cannot take place unless the shutter has been rewound. This feature does not form part of this invention and is, therefore, only mentioned briefly. For a complete description of this feature, reference is made to above mentioned Patent #2,371,072. Also fastened to the cylindrical body 44 is a ratchet 49 which cooperates with a pawl 50. This prevents the operator from accidentally turning crank 45 in the wrong direction.

The synchronizer comprises three principal parts, i. e., its motor unit, its release mechanism and its adjustable contact.

The motor unit comprises a flywheel 72 which carries the aforementioned interlock pin 71 as shown in Fig. 4. It also carries a second pin 73 which cooperates with the release mechanism. The pin also is adapted to actuate the contact, but it will be understood that the pin is used in this manner merely for convenience and that, if desired, another pin or projection can be provided for this purpose. This flywheel 72 is mounted rotatably on shaft 37 in precisely the same manner as flywheel 34 of the motor unit is mounted. It is driven by a spring 74, the other end of which is fastened to the cylindrical body 75, which in turn, is fastened to the rewinding shaft 37. In this manner both springs 36 and 74 will be reset automatically upon rotation of crank 45.

As can be seen in Fig. 3, the entire assembly comprising the motor units for both the shutter and the synchronizer is held by two brackets 76 which are part of or fastened to the camera housing. On upper bracket 76 is a cylindrical projection 77 which supports rotatably the contact carrier 78. This contact carrier is equipped with a knurled knob 79 which facilitates its rotary adjustment. It is usually desirable to provide a suitable lock to prevent involuntary rotation of the contact assembly, but since devices of this character are well known, none has been shown. Fastened to 78 is a piece 80 made from any suitable insulating material. This piece 80 carries two contact leaf springs 81 and 82 which are preferably made from sheet phosphor bronze and which carry silver contacts 83 and 84 which are normally out of contact. Fastened to contact spring 81 is a second insulating piece 85 which is adapted to come in contact with the aforementioned pin 73. Two flexible insulated wires 86 connect the two contacts to the rest of the electrical circuit.

The release mechanism is shown in detail in Figs. 7, 8 and 9, Fig. 7 as before, Fig. 8 as during, and Fig. 9 as after an exposure. The release mechanism consists of a base plate 39 which is depressible in the direction indicated by the arrow shown in Fig. 7. Fastened to this plate is a rectangular block 40 which ordinarily restrains any movement of pin 73 of the synchronizer flywheel. Also fastened to plate 39 is a pivoted lever 41 which is biased by a small spring and which can move between stop pins 42 and 43. Also mounted to plate 39 is a pin 47 which cooperates with the cam groove 46 of the sequence controlling cylindrical body 44.

The working function of the synchronizer and the coaction of the various parts can now be fully understood. Let us assume that we start with a shutter which has been reset, i. e., both springs 36 and 74 have been tensioned. In order to start an exposure the operator depresses plate 39 which now shifts from the position shown in Fig. 7 to the position shown in Fig. 8. This permits pin 73 which was restrained by the rectangular block 40, to pass above said block to the position to one side thereof as shown in Fig. 8. Pin 73 is connected to the synchronizer flywheel 72 and the release of pin 73 permits the flywheel 72 to start its rotary movement in the direction of the arrow shown in Fig. 5. Fastened to flywheel 72 is also pin 71 which, before the exposure, restrained pin 70 which, in turn, is fastened to flywheel 45 of the shutter motor unit. As can be seen in Fig. 4, as soon as pin 71 starts to move in the direction shown by the arrow, pin 70 will naturally follow, or in other words, flywheels 72 and 34 will be released by this arrangement at precisely the same moment.

Spring 74 is dimensioned in such a way that flywheel 72, upon release, moves faster than flywheel 34. As a result, a gap of increasing width will appear between pins 71 and 70 during the rotary movement of the two flywheels and flywheel 72 will complete its revolution first.

In Fig. 5, is shown a cross-section of the contact assembly in two positions, in solid and dotted lines, respectively. Referring to the position shown in solid lines it can be seen that a rotary movement of approximately 270° is required before pin 73 will come in contact with part 85 thereby flexing leaf spring 81, so that the two contact buttons 83 and 84 come in contact and close the electrical circuit for the flash lamp. As can be noted from Fig. 6, it also takes an angle of approximately 270° before flywheel 34 of the shutter actuating motor unit has turned sufficiently to bring the abutment of its cam groove 35 in operative contact with pin 33 which, in turn, through lever 31 actuates pin 28 of the blade assembly. If both motor units would move at the same speed, this would mean that the flash light contacts were closed at the same instant the exposure begins or that we would have zero time lag for the flash lamp with reference to the shutter timing. However, as explained above, the motor unit of the synchronizer moves faster than the motor unit of the shutter, and, therefore, pin 73 will strike part 85 of the contact assembly a short time interval before the cam abutment of the cam groove 35 of flywheel 34 actuates the shutter. The position of the contact assembly shown in solid lines will, therefore, be approximately adequate for flash lamps having a very short time delay, the so-called S-M type. Flash lamps having a longer time delay can be accommodated by the simple expedient of turning the contact assembly in a counter-clockwise direction, Fig. 5, so that, for example, it assumes the position shown there in dotted lines. In this position the pin 73 will actuate the contact assembly after a rotation of approximately 120° only, and the time necessary for pin 73 to travel 120° is, of course, much shorter than the time previously consumed to travel 270°. Consequently, the position shown in dotted lines would be well adapted to flash lamps having a more conventional time delay of approximately 20 milliseconds. Any intermediate position may be used if the characteristics of any flash lamps make this desirable.

After pin 73 has established electrical contact in this manner, it will continue its travel and will complete a full revolution. At the end of the revolution this pin will come in contact with pivoted lever 41 and shift it from its position shown in Figs. 7 and 8 to the position shown in Fig. 9 whereupon pin 73, and therewith the entire motor unit of the synchronizer, will come to a stop.

Flywheel 34 of the shutter actuating motor unit will follow the flywheel 72 of the synchronizer as explained above and, due to its somewhat slower speed, it will lag behind and pins 70 and 71 will be out of contact during this entire movement. Since, in this manner, no physical contact exists after release anywhere between the two systems, any loss of speed suffered by the synchronizer flywheel during the act of closing the contacts will not in any way be transmitted to, or reflect upon, the rotary movement of the shutter actuating motor unit, and the accuracy of its timing will in no way be affected by anything that may happen to flywheel 72 during the act of closing the flash light contacts.

After the synchronizer flywheel has come to a standstill at the completion of one revolution, the shutter actuating flywheel 34 will continue to rotate until at the end of one revolution its pin 70 again makes contact with pin 71 whereupon this flywheel will also come to a standstill.

The operator may now reset the shutter by winding crank 45, thereby retensioning both springs 36 and 74 simultaneously. By means of the cam groove 76 and the cooperating pin 47 the depressed release plate 39 will at the same time automatically be lifted again and restored to its original position as shown in Fig. 7. This completes the cycle and the synchronizer and shutter are now ready for another exposure.

As can be seen from Fig. 5, pin 73 associated with flywheel 72 closes contacts 83 and 84 only for a very brief period of time. This introduces a certain difficulty because the ignition of the flash lamp may become quite uncertain unless the battery is absolutely fresh which in practice is quite rare. In order to overcome this difficulty, we connect a condenser in parallel to the battery, thereby storing up a sufficient amount of energy to ignite the flash lamp with certainty even if the two contact points meet only for an exceedingly short period of time. Fig. 10, shows a battery 90, a condenser 91 in parallel thereto, the two contact points 83 and 84 which are normally open, and a flash lamp 92.

It is understood that various changes in form, proportions and minor details of construction may be resorted to without departing from the principles or sacrificing any of the advantages of the invention as defined in the appended claims.

What we claim as new is:

1. In a photographic camera, a shutter and a flash lamp synchronizer; the shutter comprising a number of pivoted blades and a motor unit adapted to actuate said blades to effect an exposure, said motor unit including a flywheel and a spring, means to tension said spring, and means to hold said spring releasably under tension; the synchronizer comprising a flash lamp, a set of normally open contacts, in series with a source of current and the flash lamp, and a second motor unit adapted to close said contacts, said second motor unit including a flywheel and a spring, means to tension said spring, and means to hold said spring releasably under tension; and means to release the springs of both motor units simultaneously; one of the elements of the motor unit of the shutter and one of the elements of the motor unit of the synchronizer being in physical contact with each other before release of the springs, said elements losing their physical contact immediately after said release.

2. In a photographic camera, a shutter and a flash lamp synchronizer; the shutter comprising a number of pivoted blades and a motor unit adapted to actuate said blades to effect an exposure, said motor unit including a flywheel and a spring, means to tension said spring, and means to hold said spring releasably under tension; the synchronizer comprising a flash lamp, a set of normally open contacts, in series with a source of current and the flash lamp, and a second motor unit, said motor unit including a flywheel with a projection adapted to close said contacts, and a spring, means to tension said spring, and means to hold said spring releasably under tension; and means to release the springs of both motor units simultaneously, the shutter being fully open after a predetermined time lag, and the contacts being closed after another but shorter time lag, both time lags being reckoned from the time of release, means to keep said first time lag constant and longer than the time required by the flash lamp to reach its peak emission, and means to adjust the second time lag so that the difference between the first and the second time lag becomes equal to the time required by the flash lamp to reach its peak emission, said last mentioned means comprising means to adjust the position of said contacts relative to the projection on the flywheel of said second motor unit.

3. In a photographic camera, a shutter and a flash lamp synchronizer; the shutter comprising a number of pivoted blades and a motor unit adapted to actuate said blades to effect an exposure, said motor unit including moving elements including a flywheel and a spring, means to tension said spring, and means to hold said spring releasably under tension; the synchronizer comprising a flash lamp, a set of normally open contacts, in series with a source of current and the flash lamp, and a second motor unit adapted to close said contacts, said motor unit including a flywheel and a spring, means to tension said spring, and means to hold said spring releasably under tension; and means to release the springs of both motor units simultaneously, said means comprising a latch restraining the flywheel of the second motor unit, and a projection on said flywheel restraining one of the moving elements of said first motor unit, the springs of the two motor units being so adjusted that, upon release, the flywheel of the second motor unit moves with a higher angular velocity than said moving element of the first motor unit.

4. In a photographic camera, a shutter and a flash lamp synchronizer; the shutter comprising light obstructing and light admitting elements and means adapted to actuate said elements to effect an exposure, said means including a spring, means to tension said spring, and means to hold said spring releasably under tension; the synchronizer comprising a motor unit including a spring driving a flywheel with a projection, a set of normally open contacts adapted to be closed for a brief period of time by said projection during the rotation of said flywheel, a source of current and a condenser in parallel therewith constituting a current generating and storage assembly, and a flash lamp, said assembly being in series with said contacts and the flash lamp, the stored energy in the condenser being so large that ignition of the flash lamp takes place with certainty in spite of the short duration of the electrical contact, means to tension said spring, and means to hold said spring releasably under tension; and means to release the springs of both motor units simultaneously.

5. A camera shutter with a built-in flash lamp synchronizer comprising two mechanical systems; the first system including a spring, means to tension said spring, means to hold said spring releasably under tension, movable elements including a rotatable flywheel adapted to be set in motion by said spring, light obstructing and light admitting elements adapted to be actuated by one of said movable elements after said element has traveled a certain distance; the second system including a second spring, means to tension said second spring, means to hold said second spring releasably under tension, movable elements, including a second rotatable flywheel adapted to be set in motion by said second spring, a set of normally open electrical contacts, in series with a source of current and a flash lamp, and adapted to be closed by one of the movable elements in the second system after said element has traveled a certain distance; means causing one of the movable elements of the first system to be, before the release of said springs, in physical contact with one of the movable members of the second system, means to release both springs simultaneously, and means causing said two last named movable elements to lose their physical contact immediately after said release, said last named means including a different ratio of spring torque to momentum of inertia of the respective flywheel for each of the two systems, whereby, after release, the two flywheels rotate at a different rate of angular velocity and independently of each other, so that resistance encountered by one system has no influence upon the movement of the other system.

ALFRED SIMMON.
LOUIS L. WEISGLASS.

REFERENCES CITED

The following references are of record in the file of this patent:

UNITED STATES PATENTS

| Number | Name | Date |
|---|---|---|
| 1,996,592 | Schwartz | Apr. 2, 1935 |
| 2,028,428 | Albers | Jan. 21, 1936 |
| 2,074,652 | Kalber | Mar. 23, 1937 |
| 2,256,354 | Riddell | Sept. 16, 1941 |
| 2,282,850 | Brownscombe | May 12, 1942 |
| 2,324,075 | Gillon | July 13, 1943 |